United States Patent
Barthel

(10) Patent No.: US 8,961,044 B2
(45) Date of Patent: Feb. 24, 2015

(54) DEVICE COMPRISING A CAMERA UNIT AND A PROTECTION ELEMENT WHICH HAS A COMPACT DISPLACEMENT PATH

(75) Inventor: Joachim Barthel, Essen (DE)

(73) Assignee: Huf Hulsbeck & Furst GmbH & Co. KG, Velbert (DE)

( * ) Notice: Subject to any disclaimer, the term of this patent is extended or adjusted under 35 U.S.C. 154(b) by 8 days.

(21) Appl. No.: 13/882,578

(22) PCT Filed: Nov. 14, 2011

(86) PCT No.: PCT/DE2011/075270
§ 371 (c)(1),
(2), (4) Date: Jul. 19, 2013

(87) PCT Pub. No.: WO2012/065603
PCT Pub. Date: May 24, 2012

(65) Prior Publication Data
US 2013/0294758 A1  Nov. 7, 2013

(30) Foreign Application Priority Data
Nov. 16, 2010  (DE) .......................... 10 2010 060 573

(51) Int. Cl.
| | |
|---|---|
| *G03B 17/00* | (2006.01) |
| *G03B 17/56* | (2006.01) |
| *G03B 11/04* | (2006.01) |
| *B60R 11/04* | (2006.01) |
| *H04N 5/225* | (2006.01) |
| *B60R 11/00* | (2006.01) |

(52) U.S. Cl.
CPC .............. *G03B 17/561* (2013.01); *G03B 11/04* (2013.01); *B60R 11/04* (2013.01); *H04N 5/2251* (2013.01); *B60R 2011/0084* (2013.01); *B60R 2011/0092* (2013.01); *B60R 2011/0094* (2013.01)
USPC ......................................................... 396/428

(58) Field of Classification Search
USPC ......................................................... 396/428
See application file for complete search history.

(56) References Cited

U.S. PATENT DOCUMENTS

| | | | | |
|---|---|---|---|---|
| 6,068,357 A | * | 5/2000 | Keller et al. .................. | 312/310 |
| 7,891,886 B2 | * | 2/2011 | Schuetz ........................ | 396/427 |
| 2012/0315027 A1 | * | 12/2012 | Schutz .......................... | 396/419 |

FOREIGN PATENT DOCUMENTS

| | | |
|---|---|---|
| DE | 102 04 764 A1 | 8/2003 |
| DE | 10 2006 048373 A1 | 4/2008 |
| DE | 10 2008 008656 A1 | 8/2009 |
| EP | 2 144 435 A2 | 1/2010 |

OTHER PUBLICATIONS

International Search Report under date of mailing of Apr. 4, 2012 in connection with PCT/DE2011/075270.

\* cited by examiner

*Primary Examiner* — Rodney Fuller
*Assistant Examiner* — Linda B Smith
(74) *Attorney, Agent, or Firm* — Quarles & Brady LLP

(57) ABSTRACT

The invention relates to a device comprising a camera unit (40) which is used to detect images of the outer area (5) of a motor vehicle. Said device comprises a drive (50) which is used to move the camera unit (40) between an idle position (3) and an active position (4) and to move a protection element (30) between a closed position (1) and an open position (2). When the protection element (30) is in the closed position (1), the camera unit (40) is in the idle position (3) behind the protection element (30) making it inaccessible from the exterior, and when the protection element (30) is in the open position (2), the camera unit (40) is in the active position (4) for detecting images. According to the invention, a mechanism comprising a pivoting element (10) and a lever element (20) is provided, said pivoting element (10) being movably mounted about a first rotational axis (13) and comprising a first arm (11) and a second arm (12), the first arm (11) engaging on the camera unit (40) and the second arm (12) on the protection element (30). The lever element is rotationally mounted about a second rotational axis (23) and is operatively connected to the protection element (30) in order to support the movement of said protection element (30), and the second arm (12) is bent in relation to the first arm (11) such that a compact displacement path of the protection element (30) between its positions (1, 2) can be obtained.

16 Claims, 2 Drawing Sheets

Figure 1:
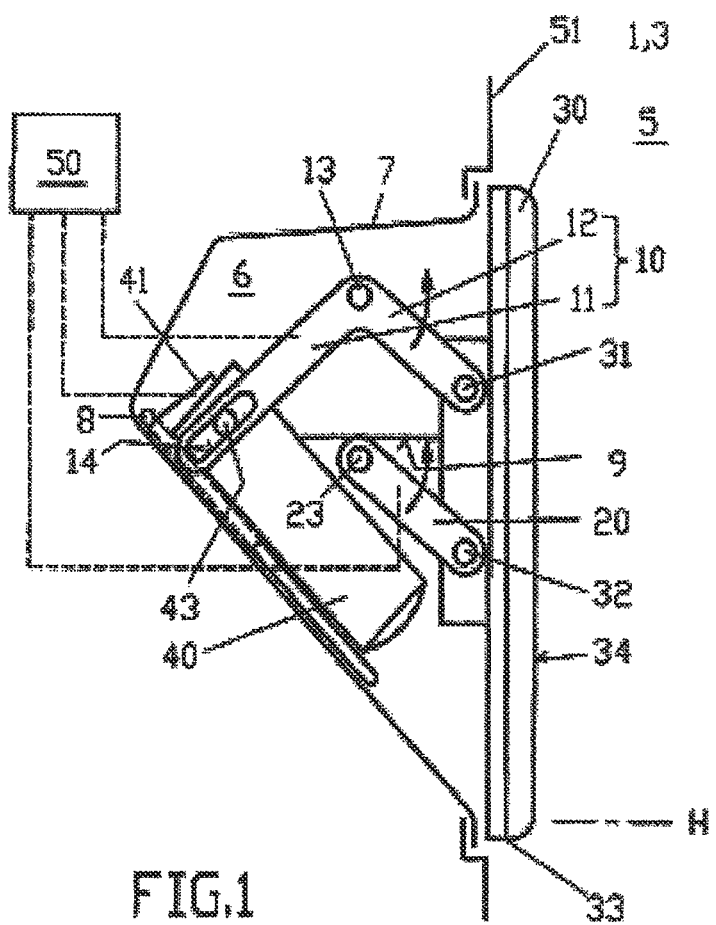

DEVICE COMPRISING A CAMERA UNIT AND A PROTECTION ELEMENT WHICH HAS A COMPACT DISPLACEMENT PATH

CROSS-REFERENCE TO RELATED APPLICATIONS

This application represents the national stage entry of PCT International Application No. PCT/DE2011/075270 filed Nov. 14, 2011 and claims the benefit of German Patent Application No. 10 2010 060 573.5 filed Nov. 16, 2010. The contents of both of these applications are hereby incorporated by reference as if set forth in their entirety herein.

The invention relates to a device comprising a camera unit which is used to capture images of the area outside the motor vehicle, having a drive which is used to move the camera unit between an inoperative position and an active position and to move a protection element between a closed position and an open position, wherein the camera unit is in its inoperative position behind the protection element, such that it is inaccessible from the outside, in the closed position of the protection element, and the camera unit is in the active position for image capture in the open position of the Protection element.

The use of cameras or a camera unit for sensing the area surrounding a vehicle is already known. Camera units of this kind are used, for example, as parking and/or manoeuvring aids in motor vehicles in order to sense, in particular, the areas around the motor vehicle which cannot be seen using the conventional mirrors of the motor vehicle.

DE 102010001108 has already described a device comprising a camera unit of the abovementioned type. Said device is distinguished particularly by its low number of components, with the functionality being ensured at the same time. It has now been found that desirable camera units on motor vehicles for image capture are those which require a low installation volume and for which the displacement path of the protection element is kept short at the same time.

The object of the present invention is therefore to meet the abovementioned requirements, in particular to provide a device comprising a camera unit which is of compact construction and for which the displacement path of the protection element between its positions is as close to the motor-vehicle body as possible.

A device having all the features of claim 1 is proposed in order to achieve this object. Preferred developments are set forth in the dependent claims.

According to the invention, a mechanism having a pivot element and a lever element is provided, wherein the pivot element is mounted such that it can be moved about a first rotation axis and has a first arm and a second arm. The first arm engages with the camera unit and the second arm engages with the protection element, wherein the lever element, which is mounted such that it can be moved about a second rotation axis, is operatively connected to the protection element in order to assist the movement of the protection element. In addition, the second arm is angled in relation the first arm in such a way that a compact displacement path of the protection element between its positions can be achieved. The particular advantage of this invention is that the angled pivot element ensures, firstly, that the camera unit can be moved between its positions in a reliable manner and, secondly, that the displacement path of the protection element runs as close to the motor-vehicle body as possible. The outer surface of the protection element is advantageously always clearly visible during the movement of the protection element between its positions. At the same time, the lever element, which is at a distance from the pivot element, is used to reliably assist the movement of the protection element between its positions, without, for example, the protection element being able to twist, tilt etc. in an undesirable manner during its movement. The present invention has the effect, in particular, that the protection element is oriented more or less parallel to the adjoining vehicle body virtually in any position of the protection element. The mechanism according to the invention is designed in such a way that said mechanism has a certain prestress in each position of the camera unit or in each position of the protection element, as a result of which the closed position and the open position of the protection element can be reliably maintained.

In a further embodiment of the invention, the mechanism having the camera unit can be located within a recess in a housing and/or the camera unit can execute a linear movement between the inoperative position and the active position, which can also be called the operating position. In the closed position of the protection element, the mechanism having the camera unit is reliably closed off in the recess, without the risk of moisture, dust etc. being able to enter said recess. On its side which faces the vehicle body, the protection element advantageously has a seal which bears immediately against the vehicle body and/or against the housing of the device according to the invention in the closed position of the protection element, as a result of which the recess in the housing is protected against external influences without any effect.

It is likewise feasible for the housing to have a guide within the recess, the camera unit being mounted in a displaceable manner in Said guide, in particular the camera unit having a slide element which is held such that it can be moved in the guide. While the camera unit is now moved between the inoperative position and the active position by means of the drive, the guide in the recess ensures that a satisfactory movement is possible without considerable noise being created by the camera unit. In one possible embodiment of the invention, the slide element is fixedly connected to the camera unit, with the slide element engaging in the guide at the same time. The slide element therefore carries the camera unit during its movement between the inoperative position and the active position. It has been found that the camera unit can be connected to the guide within the recess in a simplified manner by virtue of using the slide element. Furthermore, the slide element promotes movement of the camera unit between its positions with little noise.

According to a further preferred development of the invention, the second arm of the pivot element and the lever element have a virtually identical orientation. The second arm of the pivot element and the lever element can preferably be oriented virtually parallel. This geometric configuration of the mechanism promotes a compact overall structure of the device according to the invention.

In order to be able to perform satisfactory image capture of the area outside the motor vehicle, the guide is advantageously inclined through 30° to 50° in relation to the horizontal within the recess.

At least one sensor element can preferably be provided, which sensor element can identify the two positions of the camera unit. Different types of sensor are feasible here, for example resistive sensors, inductive sensors, magnetic-field sensors, capacitive sensors, piezoelectric sensors or optoelectronic sensors. The sensor element can be arranged, for example, in the recess, in the guide, on the camera unit, on the lever element, on the protection element, on the pivot element etc. and/or determine the position of said elements of the device according to the invention in order to then draw a conclusion about the position of the camera unit. If, for example, the camera unit is in its inoperative position or in its active position, the sensor element identifies this, as a result of which a signal is transmitted to the drive which is, for example, deactivated.

For good image capture of the area outside the motor vehicle, the lower region of the protection element can be positioned, in the open position, in such a way that a sensing angle α of up to 40°, preferably up to 50°, is created between the center axis of the camera unit and said edge region. The mechanism is designed in such a way that, in addition to the very compact displacement path of the protection element, the protection element is pivoted correspondingly far away from the active position of the camera unit that a large part of the outside area can be sensed.

In a preferred embodiment of the invention, the second arm of the pivot element can be designed to be shorter than the first arm. Furthermore, it is feasible, as an alternative or in addition, for the first arm and the second arm to form a common monolithic component. The first arm and the second at are at a defined angle in relation to one another and preferably form a boomerang-like basic shape or an L-shaped base body which is mounted between the first arm and the second arm such that it can be rotated about the first rotation axis within the recess in the housing.

According to a further preferred development of the invention, the pivot element has a first engagement point on the protection element. At the same time, the lever element can have a second engagement point on the protection element. Furthermore, the distance between the first rotation axis and the second rotation axis corresponds virtually to the distance between the first engagement point and the second engagement point. Therefore, the second arm of the pivot element and the lever element can move synchronously with one another during the movement of the protection element, this resulting in a smooth overall movement of the mechanism.

The housing advantageously has a stop, the lever element and/or the pivot element making contact with said stop in the active position and/or in the inoperative position of the camera unit. Therefore, the position of the pivot element and of the lever element in the active position and/or the inoperative position of the camera unit is firmly defined. If contact is made with the stop, corresponding feedback is transmitted to the drive.

The mechanism is preferably designed in such a way that, in the open position of the protection element, the distance between the protection element and the vehicle body is shorter than the displacement path of the protection element which is taken by the protection element during the movement from the closed position to the open position perpendicular to the horizontal. The purpose of this is for the protection element to remain as close as possible to the vehicle body in the open position and, at the same time, to not extend into the sensing area of the camera unit for image capture.

The mechanism can expediently be designed to be self-locking, so that a movement of the pivot element and/or of the lever element is blocked in spite of a potential application of force on the protection element. This means that the device is formed in such a way that the pivot element and the lever element are operatively connected to the protection element in such a way that movement of the protection element due to the action of a force, which is exerted manually from the outside, on the protection element is not possible in the closed position and/or open position of the protection element. The open position and the closed position of the protection element constitute defined stable positions which are predefined by the mechanism.

It is feasible for the drive to engage with the mechanism, wherein the drive is a linear drive and/or a rotary drive. The drive can engage, for example, with the pivot element or with the lever element or even with the camera unit. The drive can have, for example, an actuating drive which acts on the pivot element or on the lever element. By way of example, the lever element or the pivot element can be pivoted about its respective axis by means of a linear stroke movement of the actuating drive; Furthermore, the drive can have a motor, in particular an electric motor, or be in the form of a motor, in particular in the form of an electric motor. The motor can advantageously also be designed to be self locking, so that manual movement of the protection element, which is connected to the motor by means of the pivot element or the lever element, is not possible. That is to say, if, for example, the protection element is pulled, the motor of self-locking design prevents the movement of the protection element and therefore also the movement of the camera unit. Therefore, a motor of self-locking design and also the mechanism which is designed to be self-locking constitute an effective anti-theft protection means in respect of the camera unit.

The drive can also be designed as a rotary drive which can rotate selectively in the clockwise direction or counterclockwise direction by means of a crank. The crank can act on the pivot element or on the lever element, so that a rotary movement of the pivot element or the lever element can be achieved by means of movement of the crank, this being described in DE102010001108.8.

The protection element can preferably have a design element and/or an emblem on the outside. An emblem within the meaning of the invention is, in particular, a badge for a motor-vehicle make, in particular a car make. The emblem may be of two-dimensional or three-dimensional design in this case.

The concept of the invention relates to a motor vehicle which can be in the form of a truck or a passenger car. The motor vehicle may also be a boat or a ship. It is likewise feasible for the motor vehicle to be in the form of a utility vehicle, for example an excavator, a tracked vehicle, a crane etc. It is particularly advantageous for the motor vehicle to have two or more devices of this kind. In this case, a plurality of devices can be coupled to one another in such a way that they can be operated parallel to one another. The device can also have a mechanism which has at least two pivot elements which are at a distance from one another, and/or at least two lever elements which are at a distance from one another, wherein each pivot element and/or lever element correspondingly engages with the protection element.

Figure 2:
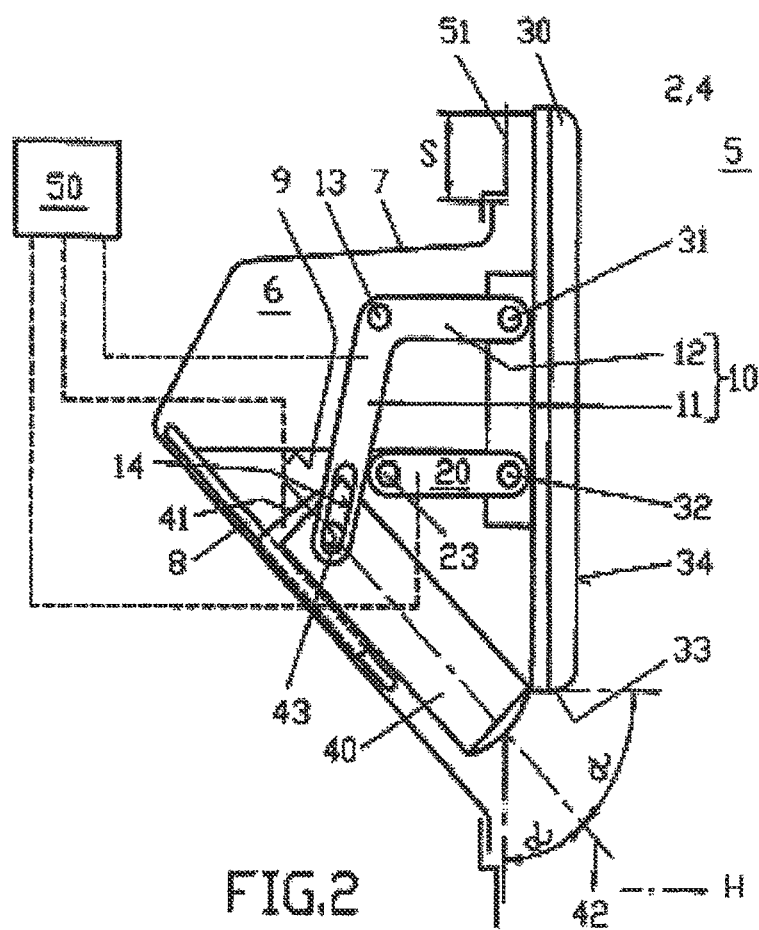

Further advantages, features and details of the invention can be found in the following description which describes, in detail, an exemplary embodiment of the invention with reference to the drawings. The features mentioned in the claims and in the description may in each case be essential to the invention on their own or in any desired combination. In the drawings:

FIG. 1 shows a schematic side view of a device according to the invention for a motor vehicle, in which device the camera unit is in the inoperative position, and FIG. 2 shows the device shown in accordance with FIG. 1, wherein the camera unit is in the active position.

Elements with the same function and manner of operation are provided with the same reference symbols in FIGS. 1 and 2 in each case.

FIG. 1 shows a side view of a variant embodiment of the device for a motor vehicle comprising a camera unit 40 which is mounted in a movable manner and which is designed in accordance with the structural principle according to the invention, with the camera unit 40 being in an inoperative position 3. In this case, the camera unit 40 is used to capture images of the area 5 outside the motor vehicle. The camera unit 40 can be moved by a mechanism, which will be described in detail below, between the inoperative position 3 and an active position 4 which is shown in FIG. 2. In the inoperative position 3, the camera unit 40 is located within a recess 6 in a housing 7 such that it is protected, with a protection element 30 reliably closing off the recess 6. The protection element 30 is a kind of cover which protects the camera unit 40 against environmental influences such as solar irradiation, rain, dirt, dust etc., but also against possible theft.

In order to correspondingly move the camera unit 40, a drive 50 (illustrated purely schematically) is provided, it being possible for said drive to act on the mechanism, in particular on a pivot element 10 and/or on a lever element 20. The pivot element 10 is mounted within the recess 6 such that it can be moved about a first rotation axis 13. In this case, the pivot element 10 has a first arm 11 and a second arm 12. The first arm 11 engages with the camera unit 40. The second arm 12 of the pivot element 10 engages with the protection element 30. The pivot element 20 is mounted such that it can be moved about a second rotation axis 23, wherein the lever element 20 is operatively connected to the protection element 30. The second arm 12 is angled in relation to the first arm 11.

The housing 7 has a guide 8 within the recess 6, the camera unit 40 being mounted such that it can be displaced in a linear manner along said guide. As is clearly shown in FIG. 1 and in FIG. 2, a slide element 41 is provided which is firstly fixed to the camera unit 40 and secondly is held in a movable manner in the guide 8. The slide element 41 is used to achieve a smooth movement of the camera unit 40 within the recess 6.

As shown in FIG. 1 and in FIG. 2, the second arm 12 is designed to be shorter than the first arm 11 according to the shown exemplary embodiment, wherein the two arms 11, 12 form a common monolithic component 11, 12. In addition, the second arm 12 of the pivot element 10 is oriented virtually parallel to the lever element 20, with the parallel orientation relating both to FIG. 1 and to FIG. 2.

The pivot element 10 has a first engagement point 31 on the protection element 30. The lever element 20 has a second engagement point 32 on the protection element 30. The two engagement points 31, 32 are located on the inside in a region of the protection element 30 which is not visible.

The housing 7 has a stop 9 which is provided within the recess 6 and with which the lever element 20 makes contact in the open position 2 of the protection element 30, this being shown in FIG. 2. In FIG. 1, the lever element 20 is at a distance from the stop 9. As an alternative, the stop 9 can be arranged in a further position within the housing 7. By way of example, a stop can be provided for the pivot element 10, in which case the pivot element 10 touches the stop in the active position 4 of the camera unit 40. It is likewise feasible to provide a further stop with which a component of the mechanism or the camera unit 40 makes contact when the camera unit 40 reaches its inoperative position 3 and/or its active position.

The first arm 11 of the pivot element 10 has an elongate hole 14 in which the camera unit 40 is mounted. An emblem 34 is provided on the outside of the protection element 30, said emblem representing the make of the motor vehicle in the present exemplary embodiment.

If image capture of the area 5 outside the motor vehicle is now performed proceeding from FIG. 1, the drive 50 drives at least one element 10, 20 of the mechanism or even the camera unit 40 directly. The drive 50 may be, for example, a linear drive or a rotary drive, but this will not be discussed in the text which follows.

Proceeding from FIG. 1, the pivot element 10 and the lever element 20 are simultaneously rotated in a counterclockwise direction. In the process, the pivot element 10 rotates about the axis 13 and the lever element 20 rotates about the axis 23. At the same time, the camera unit 40 moves along the guide 8 in the direction of the outside area 5, until the camera unit has reached its active position 4 (see FIG. 2). While the camera unit 40 moves along the guide 8, the cam 43 of the camera unit 40 moves along the elongate hole 14 in the first arm 11 of the pivot element 10. As shown in FIG. 2, the lower region 33 of the protection element 30 is positioned, in the open position 2, in such a way that a sensing angle α of the camera unit 40 of approximately 45° is created between the center axis of the camera unit 40 and said edge region 33. Satisfactory image capture of the area 5 outside the motor vehicle can be performed as a result. So that the floor area outside the motor vehicle can likewise be effectively sensed by the camera unit 40, the guide 8 and the center axis 42 of the camera unit 40 are inclined to approximately α=45° in relation to the horizontal H.

In the shown exemplary embodiment, the distance between the first rotation axis 13 and the second rotation axis corresponds roughly virtually to the distance between the first engagement point 31 and the second engagement point 32. In addition, the mechanism is designed in such a way that a compact displacement path of the protection element 30 is simultaneously achieved during the movement of the camera unit 40. In this case, the distance between the protection element 30 and the vehicle body (in the open position 2 of the protection element 30) is shorter than the displacement path S of the protection element 30 which is taken by the protection element 30 during the movement from the closed position 1 to the open position 2 perpendicular to the horizontal H.

The mechanism comprising the pivot element 10 and the lever element 20 and/or the drive 50 can be of self-locking design, so that a movement of the pivot element 10 and/or of the lever element 20 and/or of the camera unit 40 is blocked in spite of a potential, unauthorized application of force on the protection element 30.

In order to sense the positions 3, 4 and/or the positions 1, 2, at least one sensor element (not explicitly illustrated) can be provided.

As illustrated in FIG. 1 and in FIG. 2, the pivot element 10 and the lever element 20 are at a distance from one another, with only the pivot element 10 being directly operatively connected to the camera unit 40. However, the camera unit 40 and the protection element 30 are in a stable position both in the inoperative position 3 and in the active position 4 of the camera unit 40. The protection element 30 cannot be manually moved from the outside in the closed position 1 of the protection element 30, this ensuring effective anti-theft-protection of the camera unit 40.

The device shown in FIG. 1 and FIG. 2 can be arranged, for example, on a trunk lid or in a rear or front region of the motor vehicle in order to better sense, in particular, the rear or front area outside the motor vehicle for the driver. This image capture can be displayed, for example, to the driver in the passenger compartment by means of a display.

LIST OF REFERENCE SYMBOLS

1 Closed position
2 Open position
3 Inoperative position
4 Active position
5 Outside area
6 Recess 7 Housing
8 Guide
9 Stop
10 Pivot element
11 First arm
12 Second arm
13 First rotation axis
14 Elongate hole
20 Lever element
23 Second rotation axis
30 Protection element
31 First engagement point
32 Second engagement point
33 Lower edge region
34 Emblem
40 Camera unit
41 Slide element
42 Center axis
43 Cam
50 Drive
51 Vehicle body
H Horizontal
S Displacement path

The invention claimed is:

1. A device comprising:
a camera unit;
a protection element selectively protecting the camera unit;
a drive moving the camera unit between an inoperative position and an active position and moving the protection element between a closed position and an open position, wherein the camera unit is in the inoperative position behind the protection element, such that the camera unit is inaccessible from the outside, in the closed position of the protection element, and the camera unit is in the active position for image capture in the open position of the protection element; and
a mechanism having a pivot element and a lever element, wherein the pivot element is mounted such that it can be moved about a first rotation axis and has a first arm and a second arm, the first arm engages with the camera unit and the second arm engages with the protection element, the lever element is mounted to be movable about a second rotation axis and pivotally connected to the protection element at an engagement point on the protection element in order to assist movement of the protection element, and the second arm is angled in relation to the first arm in such a way that a compact displacement path of the protection element between the open and closed positions can be achieved.

2. The device as claimed in claim 1, wherein the mechanism is located within a recess in at least one of a housing and the camera unit and executes a linear movement between the inoperative position and the active position.

3. The device as claimed in claim 2, wherein the housing has a guide within the recess, the camera unit being mounted in a displaceable manner in said guide, wherein the camera unit having a slide element which is held such that it can be moved in the guide.

4. The device as claimed in claim 1, wherein the second arm and the lever element are substantially parallel.

5. The device as claimed in claim 1, wherein the guide is inclined through about 30°-50° in relation to horizontal (H).

6. The device as claimed in claim 1, wherein at least one sensor element is provided, said at least one sensor element identifying the position of the camera unit.

7. The device as claimed in claim 1, wherein a lower edge region of the protection element is positioned, in the open position, in such a way that a sensing angle α of up to 40° is created between a center axis of the camera unit and said edge region.

8. The device as claimed in claim 1, wherein the second arm is designed to be at least one of shorter than the first arm and the first arm and the second arm form a common monolithic component.

9. The device as claimed in claim 1, wherein the pivot element has a first engagement point on the protection element, and the lever element has a second engagement point on the protection element, wherein, a distance between the first rotation axis and the second rotation axis corresponds to the distance between the first engagement point and the second engagement point.

10. The device as claimed in claim 1, wherein the housing has a stop, at least one of the lever element and the pivot element making contact with said stop in at least one of the active position and in the inoperative position of the camera unit.

11. The device as claimed in claim 1, wherein the mechanism is designed in such a way that, in the open position of the protection element, a distance between the protection element and the vehicle body is shorter than the displacement path of the protection element which is taken by the protection element during the movement from the closed position to the open position perpendicular to the horizontal.

12. The device as claimed in claim 1, wherein the first arm has an elongate hole in which the camera unit is mounted.

13. The device as claimed in claim 1, wherein the mechanism is designed to be self-locking, so that a movement of at least one of the pivot element and the lever element is blocked in spite of an application of force on the protection element.

14. The device as claimed in claim 1, wherein the drive engages with the mechanism, wherein the drive is selected from a group consisting of a linear drive and a rotary drive.

15. The device as claimed in claim 1, wherein the protection element has at least one of design element and an emblem on the outside.

16. A device comprising:
a camera unit movable between an inoperative position and an active position;
a protection element movable between a closed position and an open position, wherein the camera unit is in the inoperative position behind the protection element, such that the camera unit is inaccessible from the outside, in the closed position of the protection element, and the camera unit is in the active position for image capture in the open position of the protection element; and
a mechanism having a pivot element and a lever element, wherein the pivot element movable about a first rotation axis and has a first arm and a second arm, the first arm engaging with the camera unit and the second arm engaging with the protection element, the lever element being movable about a second rotation axis and operatively connected to the protection element in order to assist movement of the protection element, and the second arm is angled relative to the first arm, in such a way that a compact displacement path of the protection element between the closed position and the open position can be achieved.

* * * * *